US012203424B2

(12) United States Patent
Host et al.

(10) Patent No.: US 12,203,424 B2
(45) Date of Patent: Jan. 21, 2025

(54) VEHICLE AND CORRESPONDING INTERNAL COMBUSTION ENGINE SYSTEM

(71) Applicant: FORD GLOBAL TECHNOLOGIES, LLC, Dearborn, MI (US)

(72) Inventors: Raymond Host, Mount Clemens, MI (US); Scott Richard Hughes, Bloomfield Hills, MI (US); Rani Kiwan, Canton, MI (US); Jeffrey J. Lock, Dearborn, MI (US); Christopher Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/305,848

(22) Filed: Apr. 24, 2023

(65) Prior Publication Data

US 2024/0352902 A1 Oct. 24, 2024

(51) Int. Cl.

*F02D 41/22* (2006.01)
*G07C 5/08* (2006.01)

(52) U.S. Cl.

CPC .......... *F02D 41/22* (2013.01); *G07C 5/0808* (2013.01); *F02D 2041/228* (2013.01); *G07C 5/0825* (2013.01)

(58) Field of Classification Search

CPC . F02D 41/22; F02D 2041/228; G07C 5/0808; G07C 5/0825

See application file for complete search history.

(56) References Cited

U.S. PATENT DOCUMENTS 5,822,986 A * 10/1998 Higashide ............... F01N 13/10 60/323
6,092,413 A 7/2000 Busch et al.
6,360,713 B1 3/2002 Kolmanovsky et al.
9,651,456 B2 5/2017 Uhrich et al.
10,215,115 B1 * 2/2019 Ranga ................. F02D 41/0002
2013/0268177 A1 * 10/2013 Wu ..................... F02D 41/1458 73/114.72

* cited by examiner

*Primary Examiner* — Grant Moubry
*Assistant Examiner* — Ruben Picon-Feliciano
(74) *Attorney, Agent, or Firm* — Vincent Mastrogiacomo; Brooks Kushman P.C.

(57) ABSTRACT

An internal combustion engine system includes a first set of cylinders, a second set of cylinders, exhaust manifolds, and exhaust gas sensors. The first set of cylinders has first and second subsets of cylinders. The second set of cylinders has third and fourth subsets of cylinders. The exhaust manifolds have primary conduits, secondary conduits branching from the primary conduits, and tertiary conduits branching from the secondary conduits. The tertiary conduits associated with each of the secondary conduits are connected to one of the first, second, third, or fourth subsets of cylinders. The exhaust gas sensors are disposed within each of the secondary conduits and are each configured to measure air-to-fuel ratios of one of the first, second, third, or fourth subsets of cylinders.

20 Claims, 8 Drawing Sheets

FO: 1-3-7-2-6-5-4-8

FO: 1-5-4-8-6-3-7-2

VEHICLE AND CORRESPONDING INTERNAL COMBUSTION ENGINE SYSTEM

TECHNICAL FIELD

The present disclosure relates to vehicles having powertrains that include engines, and control systems for such powertrains.

BACKGROUND

Vehicles may include engines that are configured to generate power and deliver the power to one or more drive wheels.

SUMMARY

An internal combustion engine system includes a first bank of cylinders, a second bank of cylinders, an exhaust system, a first exhaust gas sensor, a second exhaust gas sensor, a third exhaust gas sensor, and a fourth exhaust gas sensor. The first bank of cylinders has first and second sets of cylinders. The second bank of cylinders has third and fourth sets of cylinders. The exhaust system has primary conduits, secondary conduits branching from the primary conduits, and tertiary conduits branching from the secondary conduits. A first of the secondary conduits extends from a first of the primary conduits and branches into corresponding tertiary conduits that each connect to the first set of cylinders. A second of the secondary conduits extends from the first of the primary conduits and branches into corresponding tertiary conduits that connect to the second set of cylinders. A third of the secondary conduits extends from a second of the primary conduits and branches into corresponding tertiary conduits that connect to the third set of cylinders. A fourth of the secondary conduits extends from the second of the primary conduits and branches into corresponding tertiary conduits that connect to the fourth set of cylinders. The first, second, third, and fourth exhaust gas sensors are disposed within the first, second, third, and fourth secondary conduits, respectively, and are configured to measure air-to-fuel ratios of the first, second, third, and fourth sets of cylinders, respectively.

An internal combustion engine system includes a first bank of cylinders, a second bank of cylinders, a first exhaust manifold, a second exhaust manifold, and exhaust gas sensors. The first bank of cylinders has first and second pairs of cylinders. The second bank of cylinders has third and fourth pairs of cylinders. The first exhaust manifold is disposed between the first bank of cylinders and a first catalyst. The first exhaust manifold has a first primary conduit extending from the first catalyst; first and second secondary conduits branching from the first primary conduit; first and second tertiary conduits branching from the first secondary conduit and connected to the first pair of cylinders; and third and fourth tertiary conduits branching from the second secondary conduit and connected to the second pair of cylinders. The second exhaust manifold is disposed between the second bank of cylinders and a second catalyst. The second exhaust manifold has a second primary conduit extending from the second catalyst; third and fourth secondary conduits branching from the second primary conduit; fifth and sixth tertiary conduits branching from the third secondary conduit and connected to the third pair of cylinders; and seventh and eighth tertiary conduits branching from the fourth secondary conduit and connected to the fourth pair of cylinders. The exhaust gas sensors are disposed within each of the first, second, third, and fourth secondary conduits and are configured to measure air-to-fuel ratios of the first, second, third, and fourth pairs of cylinders.

An internal combustion engine system includes a first set of cylinders, a second set of cylinders, exhaust manifolds, and exhaust gas sensors. The first set of cylinders has first and second subsets of cylinders. The second set of cylinders has third and fourth subsets of cylinders. The exhaust manifolds have primary conduits, secondary conduits branching from the primary conduits, and tertiary conduits branching from the secondary conduits. The tertiary conduits associated with each of the secondary conduits are connected to one of the first, second, third, or fourth subsets of cylinders. The exhaust gas sensors are disposed within each of the secondary conduits and are each configured to measure air-to-fuel ratios of one of the first, second, third, or fourth subsets of cylinders.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
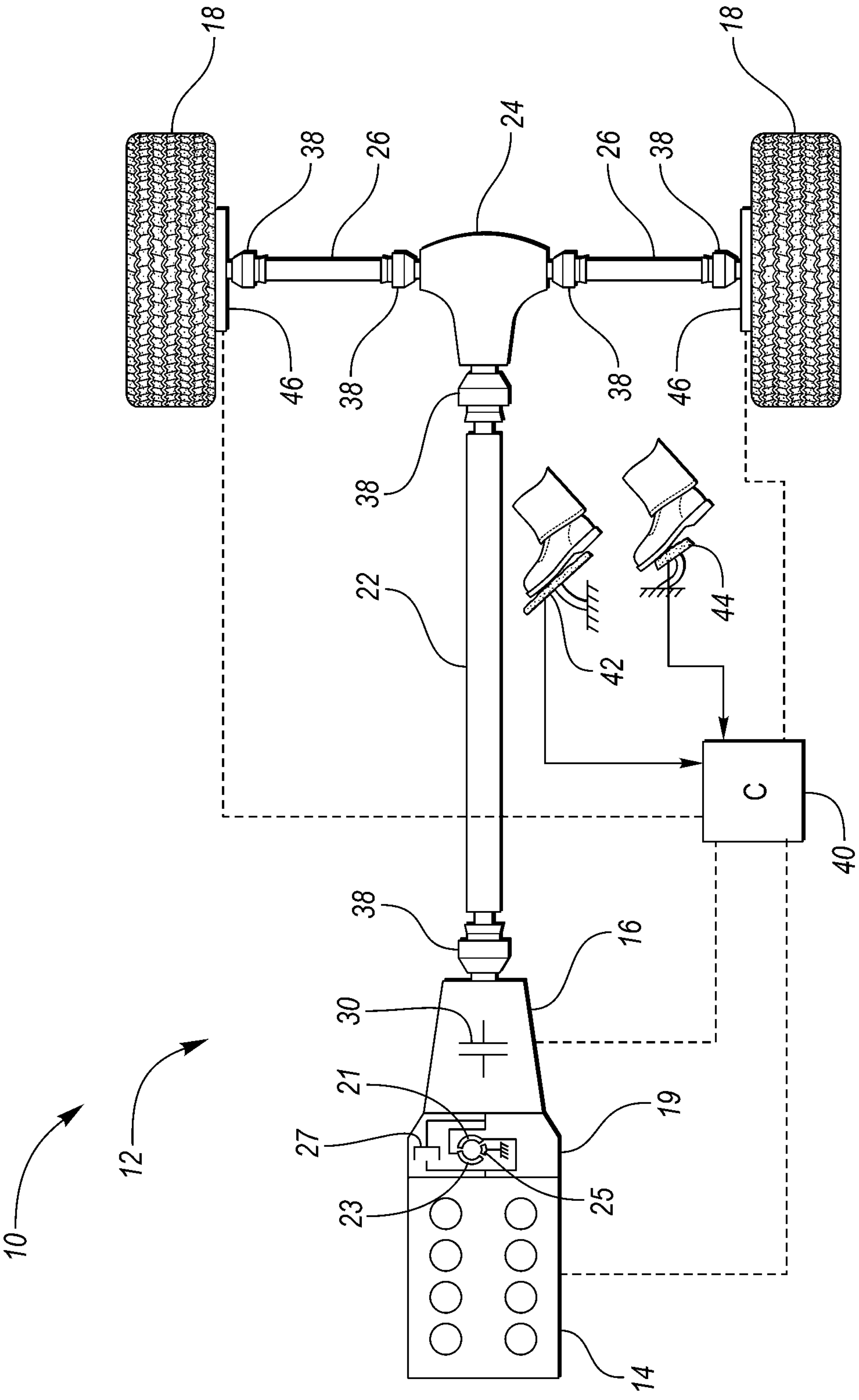
FIG. 1 is a schematic diagram representative of an exemplary vehicle and an exemplary vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The engine 14 is configured to generate power. The transmission 16 may be a multiple step-ratio automatic transmission. The powertrain 12 may utilize other power generating components (e.g., electric motors or fuel cells) in addition to the engine 14. The transmission 16 may be configured to provide multiple gear ratios between an input and an output of the transmission 16. The engine 14 is connected to the input of the transmission 16. The transmission 16 is configured to transfer power from the engine 14 to drive wheels 18 to propel the vehicle. More specifically, drivetrain components that are connected to an output of the transmission 16 are configured deliver power from the transmission 16 to the drive wheels 18.

The engine 14 may be connected to an input shaft of the transmission by a torque converter 19 or a launch clutch while an output shaft of the transmission 16 may be connected to a driveshaft 22. The driveshaft 22 may then be connected to a rear drive unit (RDU) 24. The RDU 24 may then be connected to the drive wheels 18 by half shafts 26. The RDU 24 may include a differential and/or one more clutches to control the power output to the wheels 18.

The torque converter 19 includes an impeller 21 fixed to the crankshaft of the engine 14, a turbine 23 fixed to an input shaft to the transmission 16, and a stator 25 that is grounded such that it does not rotate. The torque converter 19 thus provides a hydraulic coupling between the crankshaft of the engine 14 and the input shaft to the transmission 16. The torque converter 19 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 27 may also be provided that, when engaged, frictionally or mechanically couples the impeller and the turbine of the torque converter 19, permitting more efficient power transfer. The torque converter bypass clutch 27 may be configured to transition between an opened (or disconnected) state, a closed (or locked) state, and a slipping state. The rotation of the impeller 21 and the turbine 23 are synchronized when the torque converter bypass clutch 27 is in the closed or locked state. The rotation of the impeller 21 and the turbine 23 are non-synchronized when the torque converter bypass clutch 27 is in the opened state or the slipping state.

The transmission 16 may include gear sets (not shown) that are selectively placed in different gear ratios by selective engagement of friction elements such as clutches to establish the desired multiple discrete or step drive ratios. More specifically, the transmission 16 may have a plurality of clutches 30 configured to shift the transmission 16 between a plurality of gear ratios. The friction elements are controllable through a shift schedule that connects and disconnects certain elements of the gear sets to control the ratio between a transmission output shaft (e.g., driveshaft 22) and the transmission input shaft (e.g., a shaft connected to the crankshaft of the engine 14). The transmission 16 is automatically shifted from one ratio to another based on various vehicle and ambient operating conditions by an associated controller, such as a powertrain control unit (PCU). Power and torque from the engine 14 may be delivered to and received by transmission 16. The transmission 16 then provides powertrain output power and torque to driveshaft 22.

The various components of the powertrain 12, including the output shaft of the transmission 16, driveshaft 22, RDU 24, half shafts 26, wheels 18, may be connected to each other, as described above, via constant-velocity joints 38. Constant-velocity joints connect two rotating parts and allow the two rotating parts to rotate about different axes.

Although FIG. 1 depicts a rear-wheel drive vehicle, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. The disclosure is not limited to vehicles with automatic transmissions. For example, the vehicle may have a manual transmission. Constant-velocity joints may be disposed between any mating parts (e.g., between the half shaft and the wheels or between the half shaft and the transaxle.

The powertrain 12 further includes an associated controller 40 such as a powertrain control unit (PCU). While illustrated as one controller, the controller 40 may be part of a larger control system and may be controlled by various other controllers throughout the vehicle 10, such as a vehicle system controller (VSC). It should therefore be understood that the powertrain control unit 40 and one or more other controllers can collectively be referred to as a "controller" that controls various actuators in response to signals from various sensors to control functions such as starting/stopping engine 14, select or schedule transmission shifts, etc. Controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 40 may communicate signals to and/or from engine 14, transmission gearbox 16, torque converter 19, etc. Although not explicitly illustrated, those of ordinary skill in the art will recognize various functions or components that may be controlled by controller 40 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery, clutch pressures for launch clutch and transmission clutch, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component presence, intake air flow (MAF), transmission gear, ratio, or mode, transmission oil temperature (TOT), transmission turbine speed (TS), torque converter bypass clutch 27 status (TCC), or shift mode (MDE) for example.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 42 is used by the driver of the vehicle to provide a desired or demanded torque, power, or drive command to propel the vehicle. In general, depressing and releasing the accelerator pedal 42 generates an accelerator pedal position signal that is representative of an accelerator pedal position and may be interpreted by the controller 40 as a demand for increased power or decreased power, respectively, or as a demand for increased torque or decreased torque, respectively. A brake pedal 44 is also used by the driver of the vehicle to provide a demanded braking torque to slow the vehicle. The brake pedal 44 may configured to actuate friction brakes 46 to slow the vehicle through a hydraulic, electrical, or other system when applied. In general, depressing and releasing the brake pedal 44 generates a brake pedal position signal that may be interpreted by the controller 40 as a demand to decrease the vehicle speed. Based upon inputs from the accelerator pedal 42 and brake pedal 44, the controller 40 commands the torque to the engine 14 and friction brakes 46. The controller 40 also controls the timing of gear shifts within the transmission 16 based on one or more shift schedules that may be stored as tables within the controller. The shift schedules may be based on a demanded torque or power output via the accelerator pedal and a speed of the vehicle.

It should be understood that the vehicle configuration described herein is merely exemplary and is not intended to be limited. Other non-hybrid or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), or any other vehicle configuration known to a person of ordinary skill in the art.

Figure 2A:
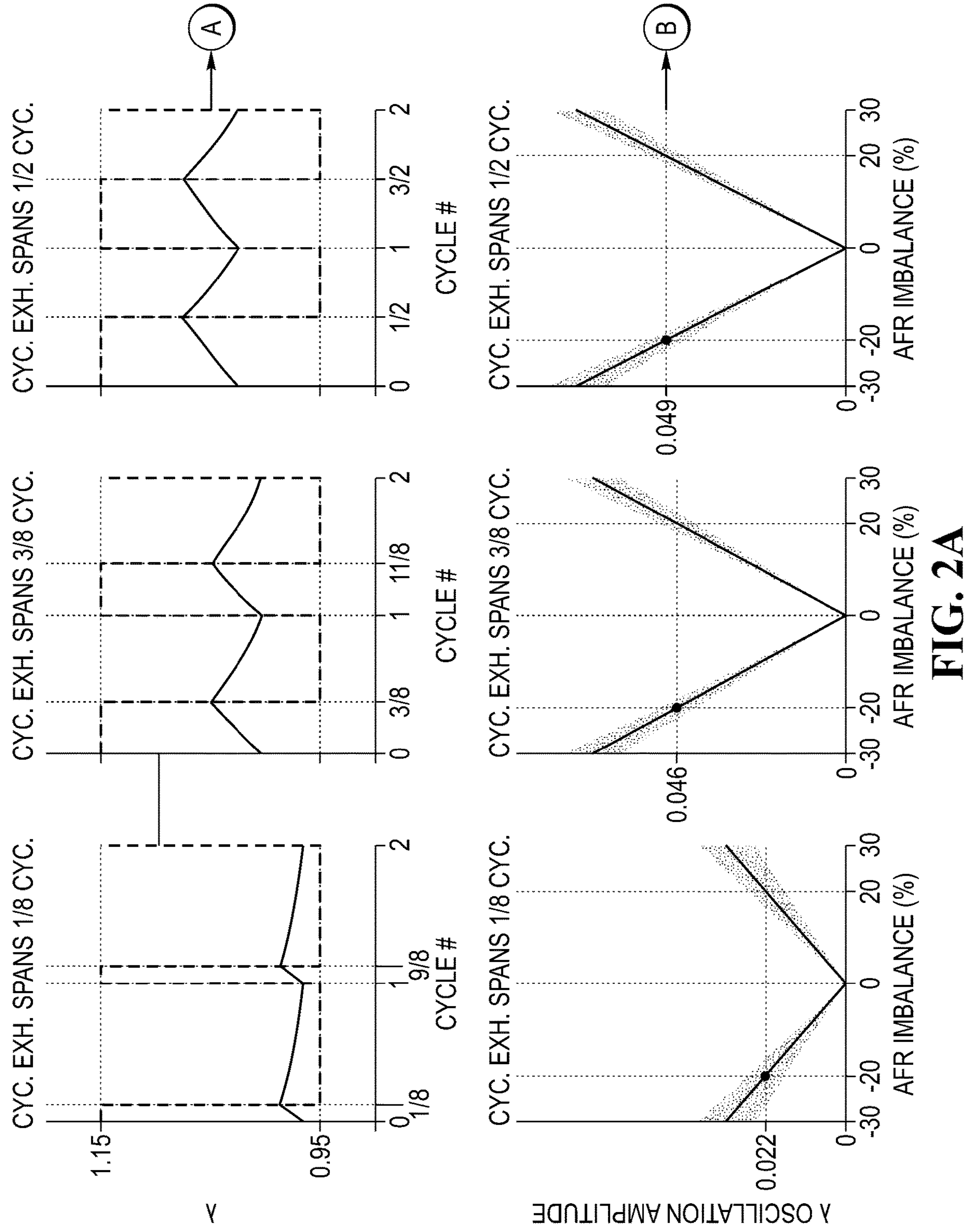
FIGS. 2A and 2B include a series of graphs illustrating air-to-fuel ratio signals from an exhaust gas sensor when there is a discrepancy in air-to-fuel ratio signals between the various cylinders being observed by the exhaust gas sensor.
Figure 2B:
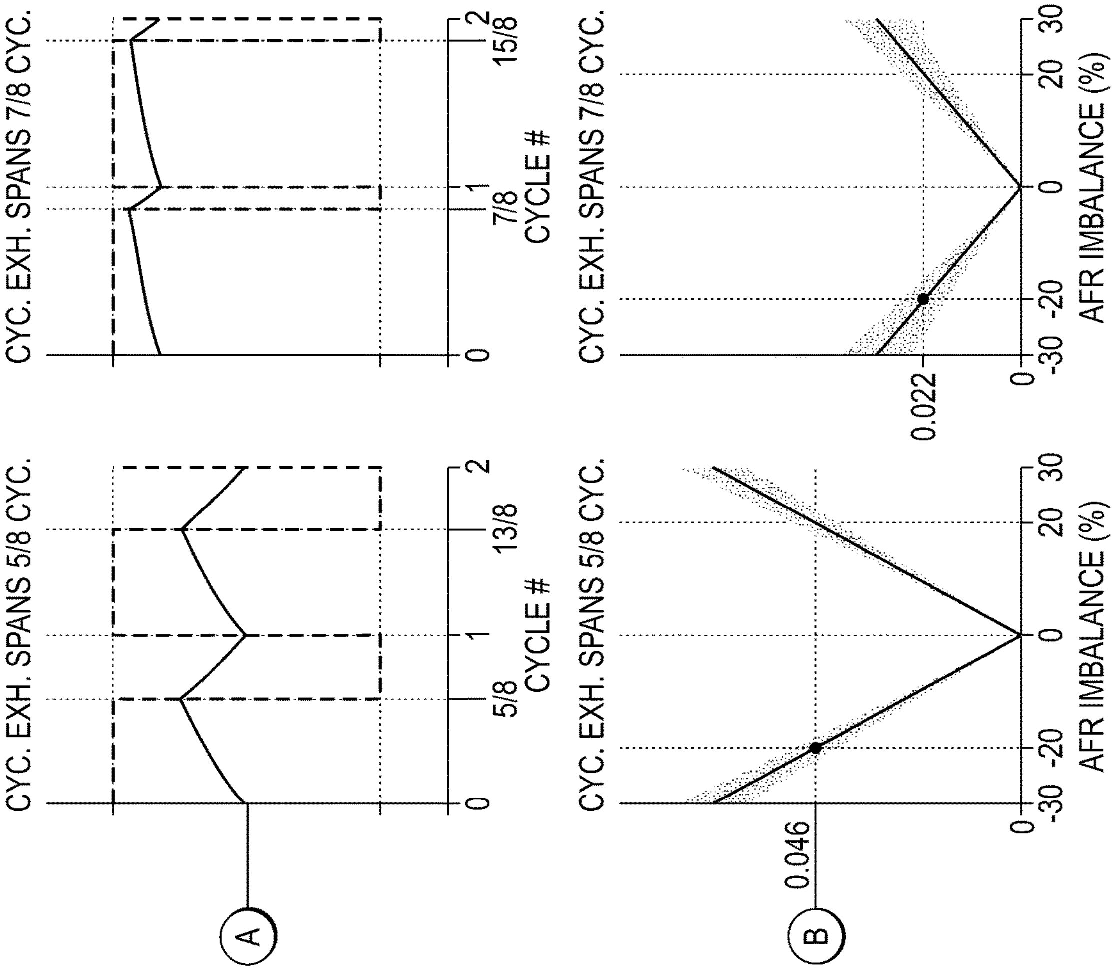

Referring to FIGS. 2A and 2B, a series of graphs of air-to-fuel ratio signals (2) from an exhaust gas sensor when there is a discrepancy in air-to-fuel ratio signals between the various cylinders being observed by the exhaust gas sensor. The exhaust gas sensors referred to herein may more specifically be universal exhaust gas oxygen (UEGO) sensors. A rich air-to-fuel ratio (AFR) may correspond to a λ value that is less than one, a lean air-to-fuel ratio may correspond to a λ value that is greater than one, and a stoichiometric air-to-fuel ratio may correspond to a λ value that is equal to one.

The upper graphs in FIGS. 2A and 2B represent a pulse from a cylinder having an air-to-fuel ratio imbalance relative to other cylinders that are being observed by a common exhaust gas sensor. The lower graphs represent an amplitude of oscillation in the λ values relative to the difference in the air-to-fuel ratios between the imbalanced cylinder and the other cylinders (the difference in the air-to-fuel ratios is shown as the AFR imbalance percentage along the horizontal axes of the lower graphs). Moving from left to right, the exposure of the exhaust gas sensor to the imbalanced cylinder relative to the other cylinders over a single engine cycle (i.e., two rotations of the crankshaft or) 720° is increased from ⅛ (or 90°) to ⅜ (or 270°) to ½ (or 360°) to ⅝ (or 450°) to ⅞ (or 630°) of the single engine cycle. The upper graphs illustrate two consecutive engine cycles (i.e., four rotations of the crankshaft or) 1440°. The lower graphs each correspond to an upper graph that is positioned immediately above the respective lower graph.

More specifically, in the example of FIGS. 2A and 2B, the imbalanced cylinder is 20% leaner relative to the other cylinders, having a λ value that is equal to 1.15 while the other cylinders have λ value that is equal to 0.95. The exhaust gas sensor λ trace is illustrated by the wave-shaped lines that increase during each pulse of the imbalanced cylinder and decrease between the pulses of the imbalanced cylinder. In this example the wave-shaped lines increase during each pulse of the imbalanced cylinders since the imbalanced cylinder is leaner relative to the other cylinders. In another example where the imbalanced cylinder is richer (e.g., 20% richer) relative to the other cylinders, then the wave-shaped lines would decrease during each pulse of the imbalanced cylinder and would increase between the pulses of the imbalanced cylinder. The slow response of the exhaust gas sensor acts like a low-pass filter reducing the amplitude of oscillation. The gradual increase in λ during a short period of exposure of the exhaust gas sensor to the lean pulse (i.e., short residency time at the exhaust gas sensors) results in a much-reduced oscillation amplitude. The amplitude of oscillation in the λ values resulting from different air-to-fuel ratio imbalance values (lean imbalance is negative/rich imbalance is positive) are depicted via the solid lines in the lower graphs. The gray area surrounding the solid line in the lower graphs represents cycle-to-cycle variation in the oscillation amplitude (due to measurement noise, combustion variability, etc.). An imbalance metric proportional to the amplitude of λ oscillation (e.g., amplitude of oscillation, or sum of absolute values of A trace deviations from cycle moving mean or median) follows a 'V-shaped' curve. Other imbalance metrics are possible; for example, an imbalance metric proportional to the square of the of λ oscillation (e.g., variance of λ samples) results in a parabolic curve. Other examples may use an imbalance metric proportional to the amplitude of oscillation of φ (reciprocal of λ) instead of λ.

As the exhaust gas sensor exposure period to the exhaust pulse from the imbalanced cylinder (i.e., residency time) is increased from ⅛ (or 90°) to ⅜(270°) to ½ (360°) of an engine cycle, the resulting measured amplitude of A oscillation for the same 20% lean imbalance (black dash-sotted traces) increases from ~ 0.022 to ~ 0.046 to ~ 0.049. Therefore, the longer period of exposure (i.e., longer residency time) allows the more time for exhaust gas sensor to react to the imbalanced cylinder resulting in a gradual increase in measured λ and larger λ oscillations. The bottom plots also show steeper curves and therefore stronger signals for an imbalance when the exposure of the imbalanced cylinder increases.

However, increasing the exhaust gas sensor period of exposure to the imbalanced cylinder beyond ½(360°) of an engine cycle reduces the measured amplitude of λ oscillations. While this non-monotonic behavior may seem counter intuitive at first, the air-to-fuel ratio imbalance is a relative metric: one cylinder air-to-fuel ratio relative to the remaining cylinders' air-to-fuel ratios (measured by the same exhaust gas senor sensor). A reduced period of exposure to either the imbalanced cylinder or the remaining cylinders reduces the λ oscillation amplitude. It is noted that the amplitude of λ oscillations corresponding to exhaust pulses spanning ⅛ and ⅞ of an engine cycle at the exhaust sensor (i.e., residency times are ⅛ and ⅞ of cycle) are the same, and the amplitude of λ oscillations corresponding to exhaust pulses spanning ⅜ and ⅝ of an engine cycle the exhaust sensor (i.e., residency times are ⅜ and ⅝ of cycle) are the same. Therefore, a first cylinder with an exhaust pulse spanning a fraction (f) of an engine cycle (at the exhaust sensor) and a second cylinder with an exhaust pulse spanning 1-f of an engine cycle (at the exhaust sensor) would achieve a similar-strength λ oscillation amplitude correspond to a signal of an air-to-fuel ratio imbalance between cylinders.

Figure 3:
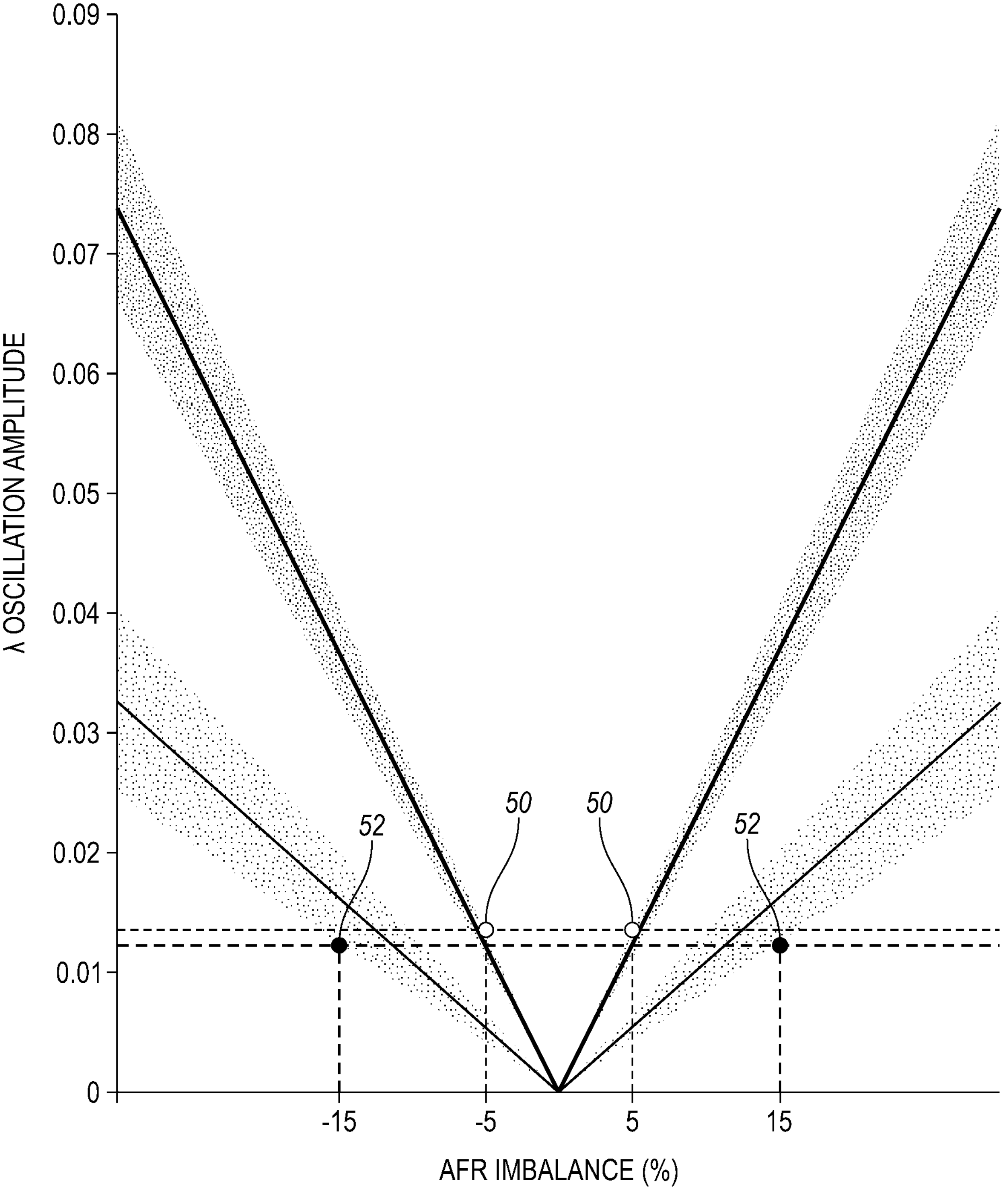
FIG. 3 is a series of graphs illustrating the measured amplitude of air-to fuel ratio oscillations in cross-plane crank V8 with one exhaust gas sensor per bank of four cylinders.

Referring to FIG. 3, is a series of graphs of the measured amplitude of λ oscillations in cross-plane crank V8 with one exhaust gas sensor per bank of four cylinders is illustrated. The spacing between the firing orders of cylinders in each bank is between 90°, 180° and 270° of a single engine cycle. Exhaust pulses from cylinders firing only 90° apart from each other during a single engine cycle will have a shorter residency time at the exhaust gas sensor for each bank of cylinders resulting in lower amplitude λ oscillations and a weaker imbalance signal (e.g., lower V-shaped graph in FIG. 3). Exhaust pulses from cylinders 270° apart from each other during a single engine cycle will have a longer residency time at the bank exhaust gas sensor resulting higher amplitude λ oscillations and a stronger imbalance signal (e.g., upper V-shaped graph in FIG. 3).

In order to have a capable and reliable air-fuel ratio imbalance monitor (AFRIM), all the oscillation signals due to nominal air-to-fuel ratio imbalances (e.g., ±5%) should fall below a detection threshold to evade false positives and all the oscillations signals due to fault imbalances (e.g., ±15%) should fall above the detection threshold to evade false negatives and remain within a desired emissions range. In the example in FIG. 3, the largest nominal imbalance signals (dots 50) result in a larger signal from the smallest fault imbalance signals (dots 52). Under such a scenario, it may not be possible to maintain all of the oscillation signals corresponding to nominal values below a detection threshold while also maintaining all of the oscillation signals corresponding to fault imbalances above the detection threshold. Therefore, the proposal described herein employs several exhaust gas sensors that are properly placed along the exhaust system so that the exhaust pulses from cylinders that are detected by each exhaust gas sensor are spaced at least 270° apart, resulting in a strong oscillation signal if there is an air-to-fuel ratio discrepancy between the cylinders feeding exhaust gas to each exhaust gas sensor.

Figure 4:
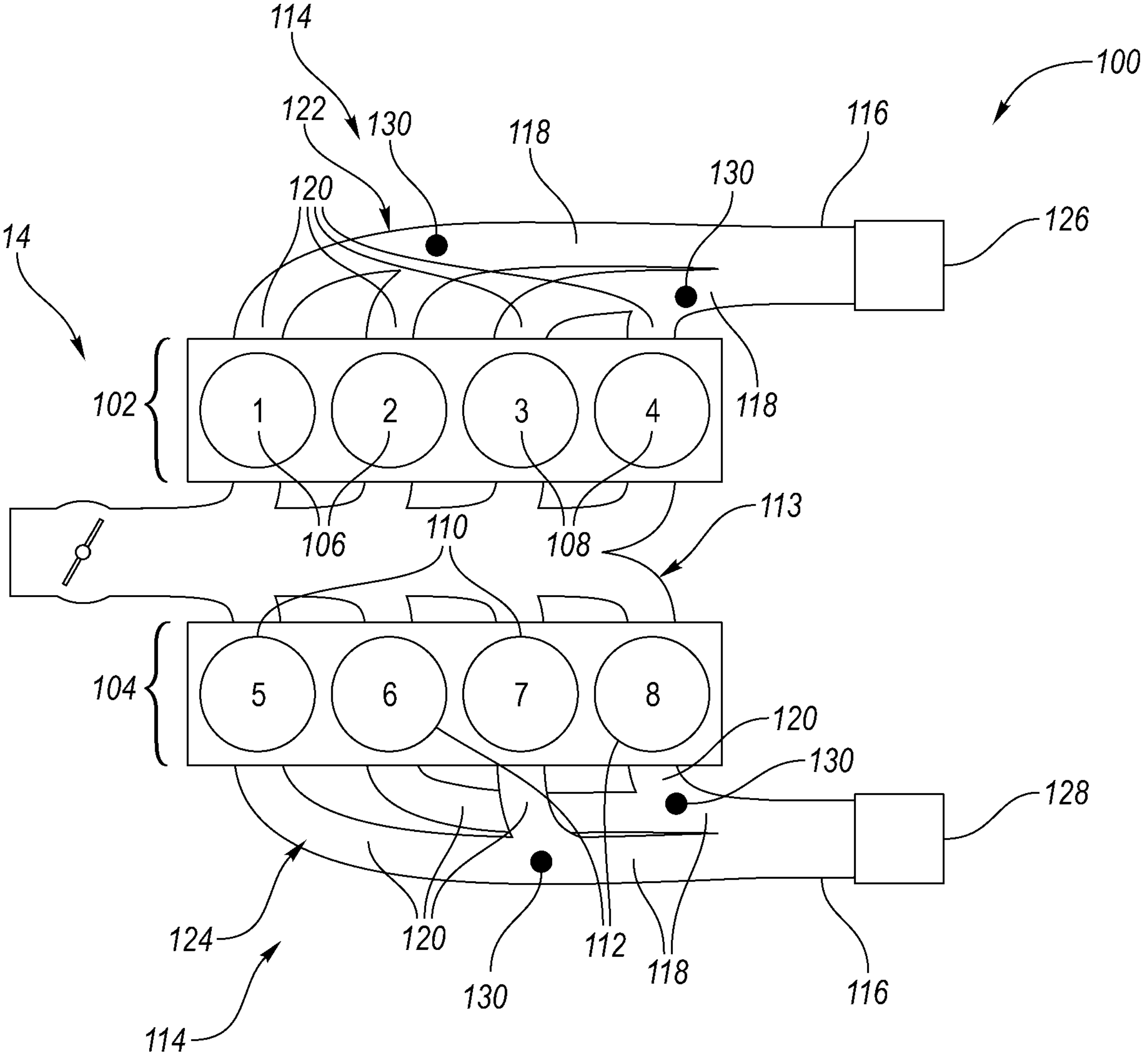
FIG. 4 is a schematic diagram of an internal combustion engine system.

Referring to FIG. 4, an internal combustion engine system 100 is illustrated. The internal combustion engine system 100 includes the engine 14. The engine 14 may be a V8 engine. The engine 14 includes a first bank of cylinders 102 and a second bank of cylinders 104. The first bank of cylinders 102 has a first set or pair of cylinders 106 and a second set or pair of cylinders 108. The second bank of cylinders 104 has a third set or pair of cylinders 110 and a fourth set or pair of cylinders 112. The first bank of cylinders 102 and the second bank of cylinders 104 may be referred to as sets of cylinders, while the first set cylinders 106, second set of cylinders 108, third set of cylinders 110, and fourth set of cylinders 112 may be referred to as subsets of cylinders.

The internal combustion engine system 100 includes an air intake or intake manifold 113 and an exhaust system 114. The exhaust system 114 has primary conduits 116; secondary conduits 118 branching and extending from the primary conduits 116; and tertiary conduits 120 branching and extending from the secondary conduits 118. More specifically, the exhaust system 114 may include a first exhaust manifold 122 and a second exhaust manifold 124 that include the primary conduits 116, secondary conduits 118, and tertiary conduits 120. The first exhaust manifold 122 is disposed between and connected to each of the first bank of cylinders 102 and a first catalyst 126. The second exhaust manifold 124 is disposed between and connected to each the second bank of cylinders 104 and a second catalyst 128. The first catalyst 126 and the second catalyst 128 may be configured to filter CO gases, NOx gases, and unspent hydrocarbons from the exhaust.

The first exhaust manifold 122 includes: a first of the primary conduits 116 extending from the first catalyst 126; a first and a second of the secondary conduits 118 that each branch from the first of the primary conduits 116; a first and a second of the tertiary conduits 120 branching from the first of the secondary conduits 118 and connected to the first set of cylinders 106; and a third and a fourth of the tertiary conduits 120 branching from the second of the secondary conduits 118 and connected to the second set of cylinders 108. The second exhaust manifold 124 includes: a second of the primary conduits 116 extending from the second catalyst 128; a third and a fourth of the secondary conduits 118 that each branch from the second of the primary conduits 116; a fifth and a sixth of the tertiary conduits 120 branching from the third of the secondary conduits 118 and connected to the third set of cylinders 110; and a seventh and an eighth of the tertiary conduits 120 branching from the fourth of the secondary conduits 118 and connected to the fourth set of cylinders 112.

Exhaust gas sensors 130 may be disposed within each of the secondary conduits 118. The exhaust gas sensors 130 may include first, second, third, and fourth exhaust gas sensors 130 that are configured to measure air-to-fuel ratios of the first, second, third, and fourth sets of cylinders, 106, 108, 110, and 112, respectively, and relay or communicate the air-to-fuel ratios of the first, second, third, and fourth sets of cylinders, 106, 108, 110, and 112, respectively, to the controller 40. The exhaust gas sensors 130 may be UEGO sensors. The secondary conduits 118 are segregated upstream of the corresponding primary conduit 116 and catalyst (e.g., first catalyst 126 and second catalyst 128) so that the exhaust from each set of cylinders (e.g., first, second, third, and fourth sets of cylinders, 106, 108, 110, and 112) is not mixed with the exhaust from the other sets of cylinders along the placement positions of the exhaust gas sensors 130.

The internal combustion engine system 100 includes a firing order where the cylinders within each set of cylinders (e.g., first, second, third, and fourth sets of cylinders, 106, 108, 110, and 112) are separated by a firing order that is at least 270° (3/8 of a single engine cycle), but is preferably between 270° (3/8 of a single engine cycle) and 450° (5/8 of a single engine cycle) so that there is a strong oscillation signal if there is an air-to-fuel ratio discrepancy or imbalance between the cylinders within one of the sets of cylinders (e.g., first, second, third, and fourth sets of cylinders, 106, 108, 110, and 112). For example, the cylinders may be labelled 1-8 and the firing order may be 1-3-7-2-6-5-4-8, as shown in FIG. 4, with the separation between each cylinder within the firing order being a 90° turn of the crankshaft or 1/8 of a single engine cycle.

Figure 5:
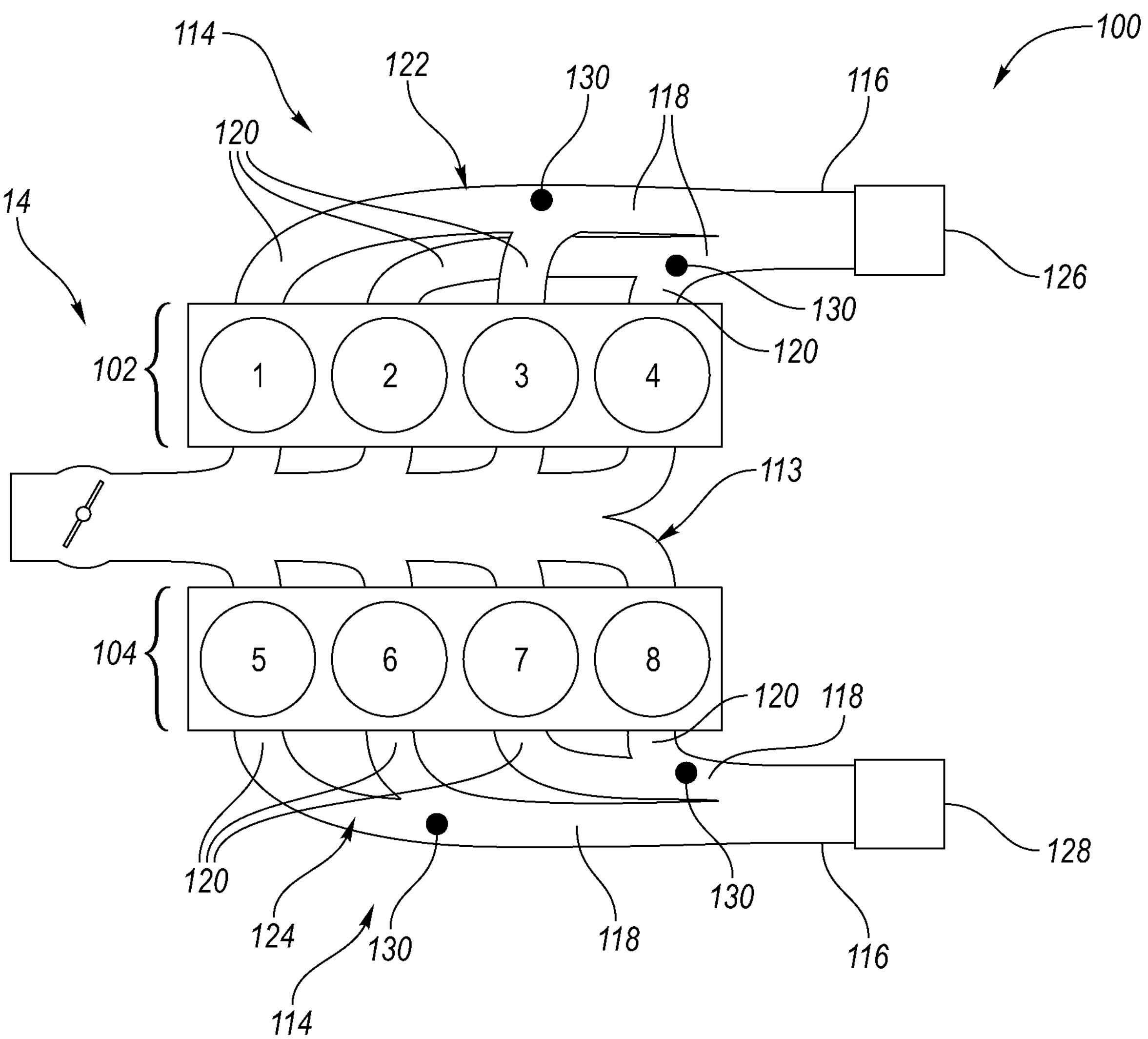
FIG. 5 is a schematic diagram of an alternative configuration of the internal combustion engine system.

Referring to FIG. 5, an alternative configuration of the internal combustion engine system 100 is illustrated. The alternative configuration of the internal combustion engine system 100 should be construed as having the same characteristics, functions, and subcomponents as the internal combustion engine system 100 depicted in FIG. 4 unless otherwise stated herein. The alternative configuration of the internal combustion engine system 100 differs from the internal combustion engine system 100 depicted in FIG. 4 in that the alternative configuration of the internal combustion engine system 100 has a firing order 1-5-4-8-6-3-7-2, as shown in FIG. 5, with the separation between each cylinder within the firing order being a 90° turn of the crankshaft or 1/8 of a single engine cycle. In order to maintain first, second, third, and fourth sets of cylinders where the cylinders within each set is separated by a firing order that is at least 270°, but is preferably between 270° and 450°. (i) the sets of cylinders are rearranged between cylinders 1-8; and (ii) the primary conduits 116, secondary conduits 118, and tertiary conduits 120 are reconfigured so that one secondary conduit 118 is connected to each rearranged set of cylinders via tertiary conduits 120, and so that each set of cylinders communicates with one exhaust gas sensor 130. The internal combustion engine system 100 depicted in FIG. 4 may be utilized in a truck while the alternative configuration of the internal combustion engine system 100 may be utilized in a sedan or coupe.

Figure 6:
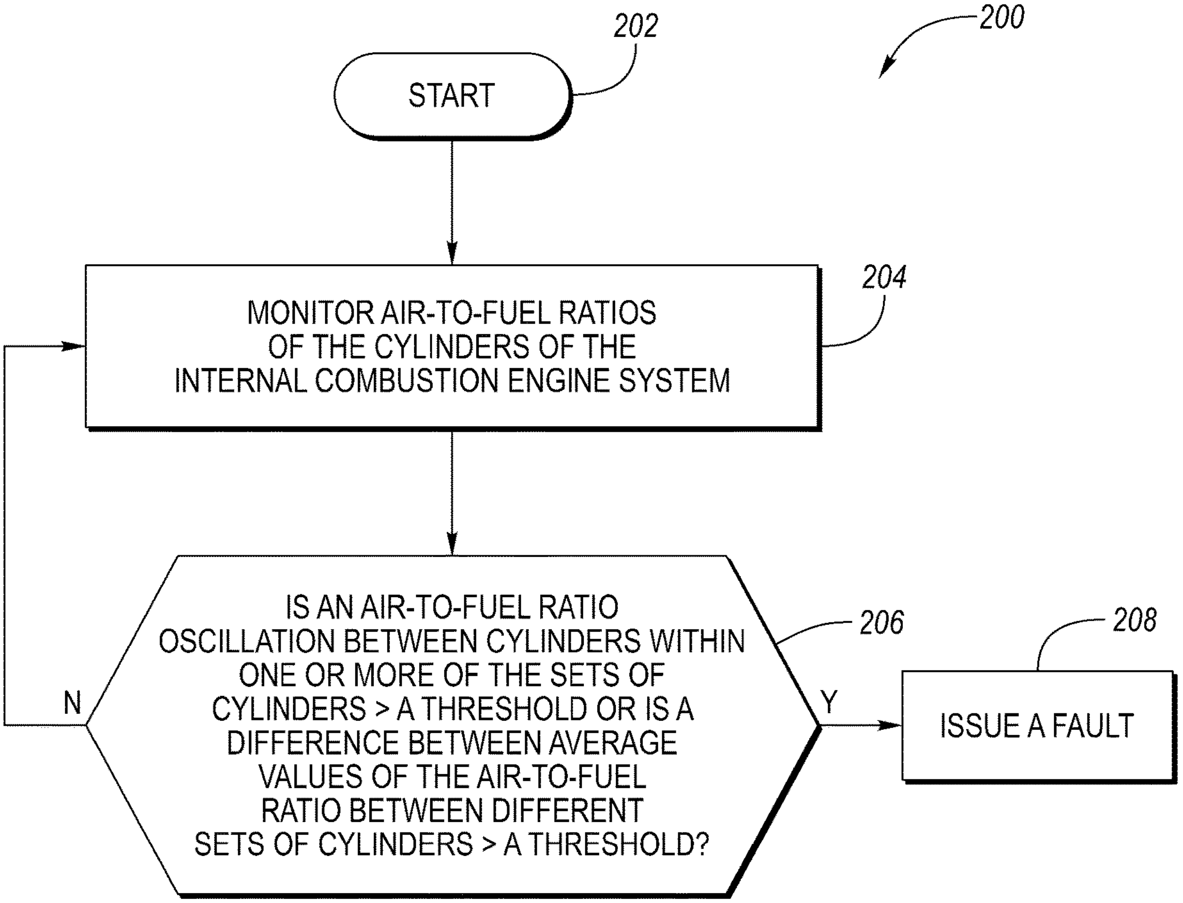
FIG. 6 is a flowchart illustrating a first method of monitoring the air-to-fuel ratios within the cylinders of the internal combustion engine system.

Referring to FIG. 6, a flowchart of a first method 200 of monitoring the air-to-fuel ratios within the cylinders of the internal combustion engine system 100 is illustrated. The method 200 may be stored as control logic and/or an algorithm within the controller 40. The controller 40 may implement the method 200 by controlling the various components of the vehicle 10. The method 200 begins at start block 202. Start block 202 may correspond to an engagement of a vehicle ignition or a "key on" condition that indicates an operator initiating a new drive cycle for operating the vehicle 10.

Next, the method 200 moves to block 204 where the air-to-fuel ratios of the cylinders of the internal combustion engine system 100 are monitored via the exhaust gas sensors 130. Next, the method 200 moves onto block 206 where it is determined (i) if an oscillation in the measured air-to-fuel ratios of the cylinders within one or more of the sets of cylinders (e.g., the cylinders within the first, second, third, or fourth sets of cylinders, 106, 108, 110, or 112) detected by the corresponding exhaust gas sensor 130 exceeds a threshold or (ii) if a difference a difference or an absolute value of a difference between average values of the air-to-fuel ratios between different sets of cylinders (e.g., the first, second, third, or fourth sets of cylinders, 106, 108, 110, and 112) over a predetermined period of time is greater a threshold. Optionally, the second portion of block 206 may only consider if the difference between the average values of the air-to-fuel ratio between the different sets of cylinders is greater than the threshold within a common bank of cylinders (e.g., the first bank of cylinders 102 and the second bank of cylinders 104).

If the answer at block 206 is NO, the method 200 returns to block 204 and continues to monitor the air-to-fuel ratios of the cylinders of the internal combustion engine system 100. If the answer at block 206 is YES, the method 200 moves on to block 208 where the controller 40 issues a fault due to an air-to-fuel ratio imbalance between the cylinders of the internal combustion engine system 100. The fault may include illuminating a light on a control panel, providing audible feedback, providing haptic feedback, etc. It should be understood that the flowchart in FIG. 6 is for illustrative purposes only and that the method 200 should not be construed as limited to the flowchart in FIG. 6. Some of the steps of the method 200 may be rearranged while others may be omitted entirely.

Figure 7:
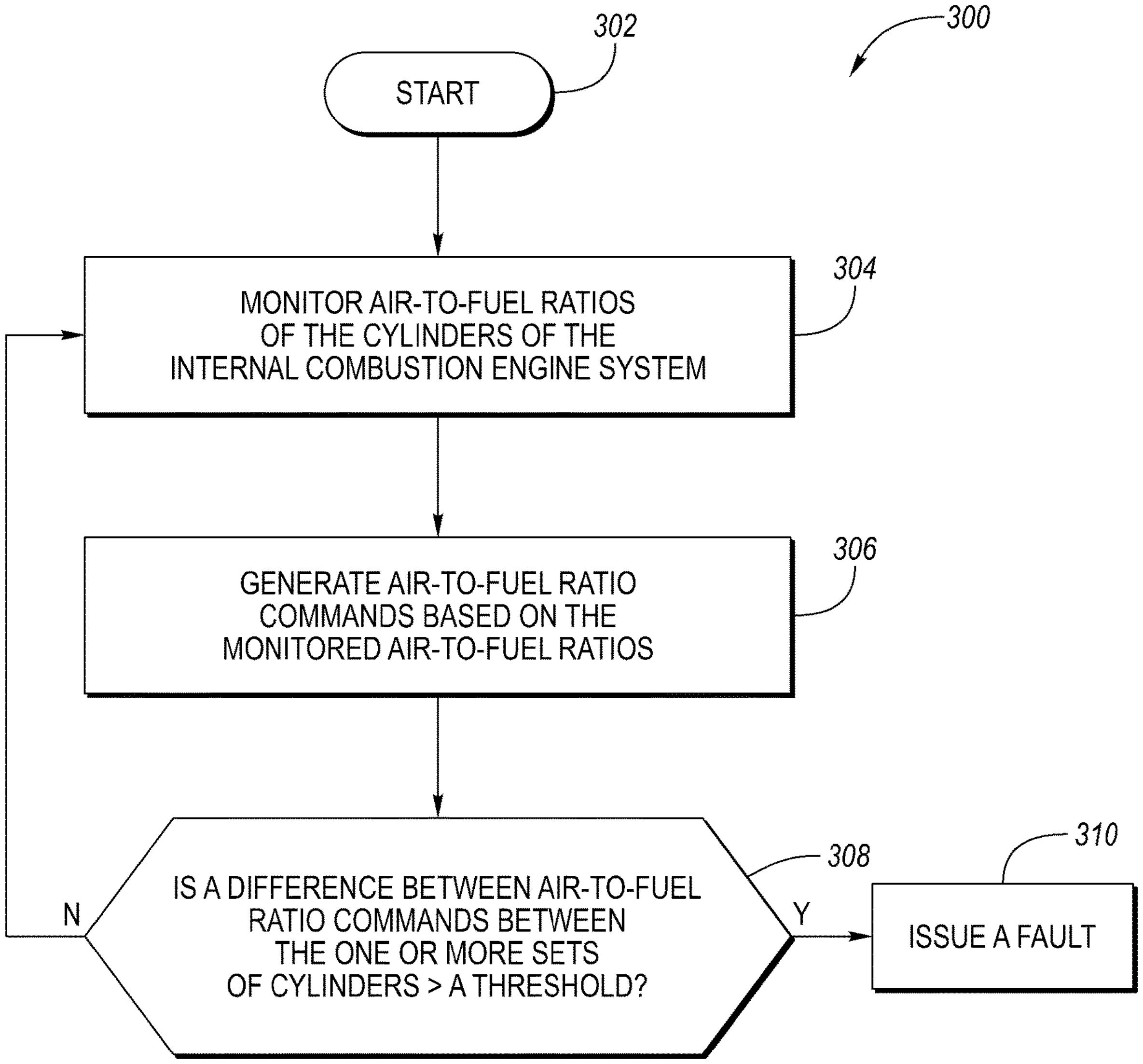
FIG. 7 is a flowchart illustrating a second method of monitoring the air-to-fuel ratios within the cylinders of the internal combustion engine system.

Referring to FIG. 7, a flowchart of a second method 300 of monitoring the air-to-fuel ratios within the cylinders of the internal combustion engine system 100 is illustrated. The method 300 may be stored as control logic and/or an algorithm within the controller 40. The controller 40 may implement the method 300 by controlling the various components of the vehicle 10. The method 300 begins at start block 302. Start block 302 may correspond to an engagement of a vehicle ignition or a "key on" condition that indicates an operator initiating a new drive cycle for operating the vehicle 10.

The method 300 moves to block 304 where the air-to-fuel ratios of the cylinders of the internal combustion engine system 100 are monitored via the exhaust gas sensors 130. Next, the method 300 moves on to block 306 where the air-fuel-ratio commands or air-fuel ratio feedback corrections to each of the sets of cylinders (e.g., the first, second, third, or fourth sets of cylinders, 106, 108, 110, or 112) are generated based on the air-fuel-ratios monitored or measured at block 304. The method 300 then moves onto block 308 where it is determined if a difference of an absolute value of a difference between the air-to-fuel ratio commands or air-fuel ratio feedback corrections between the sets of cylinders (e.g., the first, second, third, or fourth sets of cylinders, 106, 108, 110, or 112) exceeds a threshold. Other embodiments may compute an air-fuel ratio error as a difference between air-fuel ratio commands and (average values) of measured air-fuel ratios. At block 308, it is determined if a difference or an absolute value of a difference between the air-to-fuel ratio errors between the sets of cylinders (e.g., the first, second, third, or fourth sets of cylinders, 106, 108, 110, or 112) exceeds a threshold. Optionally, block 308 may only consider if the difference between the air-to-fuel ratios between sets of cylinders is within a common bank of cylinders (e.g., the first bank of cylinders 102 and the second bank of cylinders 104).

If the answer at block 308 is NO, the method 300 returns to block 304 and continues to monitor the air-to-fuel ratios of the cylinders of the internal combustion engine system 100. If the answer at block 308 is YES, the method 300 moves on to block 310 where the controller 40 issues a fault due to an air-to-fuel ratio imbalance between the cylinders of the internal combustion engine system 100. The fault may include illuminating a light on a control panel, providing audible feedback, providing haptic feedback, etc. It should be understood that the flowchart in FIG. 7 is for illustrative purposes only and that the method 300 should not be construed as limited to the flowchart in FIG. 7. Some of the steps of the method 300 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An internal combustion engine system comprising:

a first bank of cylinders having first and second sets of cylinders;

a second bank of cylinders having third and fourth sets of cylinders;

an exhaust system having (i) primary conduits, (ii) secondary conduits branching from the primary conduits, (iii) tertiary conduits branching from the secondary conduits, wherein (a) a first of the secondary conduits extends from a first of the primary conduits and branches into corresponding tertiary conduits that each connect to the first set of cylinders, (b) a second of the secondary conduits extends from the first of the primary conduits and branches into corresponding tertiary conduits that connect to the second set of cylinders, (c) a third of the secondary conduits extends from a second of the primary conduits and branches into corresponding tertiary conduits that connect to the third set of cylinders, and (d) a fourth of the secondary conduits extends from the second of the primary conduits and branches into corresponding tertiary conduits that connect to the fourth set of cylinders; and first, second, third, and fourth exhaust gas sensors (i) disposed within the first, second, third, and fourth secondary conduits, respectively, and configured to measure air-to-fuel ratios of the first, second, third, and fourth sets of cylinders, respectively, wherein (a) the first exhaust gas sensor is positioned within the first secondary conduit downstream of the corresponding tertiary conduits and upstream of the first of the primary conduits, (b) the second exhaust gas sensor is positioned within the second secondary conduit downstream of the corresponding tertiary conduits and upstream of the first of the primary conduits, (c) the third exhaust gas sensor is positioned within the third secondary conduit downstream of the corresponding tertiary conduits and upstream of the second of the primary conduits, and (d) the fourth exhaust gas sensor is positioned within the fourth secondary conduit downstream of the corresponding tertiary conduits and upstream of the second of the primary conduits.

2. The internal combustion engine system of claim 1, wherein each cylinder within each of the first, second, third, and fourth sets of cylinders have firing orders that are separated by at least 270°.

3. The internal combustion engine system of claim 1, wherein each cylinder within each of the first, second, third, and fourth sets of cylinders have firing orders that are separated by a value that ranges between 270° and 450°.

4. The internal combustion engine system of claim 1 further comprising a controller, wherein (i) the first, second, third, and fourth exhaust gas sensors are configured to communicate the measured air-to-fuel ratios of the first, second, third, or fourth sets of cylinders to the controller, respectively, and (ii) the controller is programmed to, in response to an oscillation in the measured air-to-fuel ratios-of (a) between the cylinders within the first set of cylinders as measured by the first exhaust gas sensor exceeding a threshold, (b) between the cylinders within the second set of cylinders as measured by the second exhaust gas sensor exceeding the threshold, (c) between the cylinders within the third set of cylinders as measured by the third exhaust gas sensor exceeding the threshold, or (d) between the cylinders within the fourth set of cylinders as measured by the fourth exhaust gas sensor exceeding the threshold, issue a fault.

5. The internal combustion engine system of claim 1 further comprising a controller, wherein (i) the first and second exhaust gas sensors are configured to communicate the measured air-to-fuel ratios of the first and second sets of cylinders to the controller, respectively, and (ii) the controller is programmed to, in response to a difference or an absolute value of the difference between (a) average values of the measured air-to-fuel ratios of the cylinders within the first set of cylinders as measured by the first exhaust gas sensor and (b) average values of the measured air-to-fuel ratios of the cylinders within the second sets of cylinders as measured by the second exhaust gas sensor exceeding a threshold, issue a fault.

6. The internal combustion engine system of claim 5, wherein (i) the third and fourth exhaust gas sensors are configured to communicate the measured air-to-fuel ratios of the third and fourth sets of cylinders to the controller, respectively, and (ii) the controller is programmed to, in response to a difference or an absolute value of the difference between (a) average values of the measured air-to-fuel ratios of the cylinders with the third set of cylinders as measured by the third exhaust gas sensor and (b) average values of the measured air-to-fuel ratios of the cylinders within the fourth sets of cylinders as measured by the fourth exhaust gas sensor exceeding a threshold, issue a fault.

7. The internal combustion engine system of claim 1 further comprising a controller, wherein (i) the first and second exhaust gas sensors are configured to communicate the measured air-to-fuel ratios of the first and second sets of cylinders to the controller, respectively, (ii) the controller is configured to generate air-to-fuel ratio commands to the first and second sets of cylinders based on the measured air-to-fuel ratios from the first and second exhaust gas sensors, and (iii) the controller is programmed to, in response to a difference or an absolute value of the difference between the air-to-fuel ratio commands to the first and second sets of cylinders exceeding a threshold, issue a fault.

8. The internal combustion engine system of claim 7, wherein (i) the third and fourth exhaust gas sensors are configured to communicate the measured air-to-fuel ratios of the third and fourth sets of cylinders to the controller, respectively, (ii) the controller is configured to generate air-to-fuel ratio commands to the third and fourth sets of cylinders based on the measured air-to-fuel ratios from the third and fourth exhaust gas sensors, and (iii) the controller is programmed to, in response to a difference or an absolute value of the difference between the air-to-fuel ratio commands to the third and fourth sets of cylinders exceeding a threshold, issue a fault.

9. An internal combustion engine system comprising:

a first bank of cylinders having first and second pairs of cylinders;

a second bank of cylinders having third and fourth pairs of cylinders;

a first exhaust manifold disposed between the first bank of cylinders and a first catalyst, the first exhaust manifold having (i) a first primary conduit extending from the first catalyst, (ii) first and second secondary conduits branching from the first primary conduit, (iii) first and second tertiary conduits branching from the first secondary conduit and connected to the first pair of cylinders, and (iv) third and fourth tertiary conduits branching from the second secondary conduit and connected to the second pair of cylinders;

a second exhaust manifold disposed between the second bank of cylinders and a second catalyst, the second exhaust manifold having (i) a second primary conduit extending from the second catalyst, (ii) third and fourth secondary conduits branching from the second primary conduit, (iii) fifth and sixth tertiary conduits branching from the third secondary conduit and connected to the third pair of cylinders, and (iv) seventh and eighth tertiary conduits branching from the fourth secondary conduit and connected to the fourth pair of cylinders; and exhaust gas sensors (i) disposed within each of the first, second, third, and fourth secondary conduits and (ii) configured to measure air-to-fuel ratios of the first, second, third, and fourth pairs of cylinders, wherein (a) a first of the exhaust gas sensors is positioned within the first secondary conduit downstream of the first and second tertiary conduits and upstream of the first primary conduit, (b) a second of the exhaust gas sensors is positioned within the second secondary conduit downstream of the third and fourth tertiary conduits and upstream of the first primary conduit, (c) a third of the exhaust gas sensors is positioned within the third secondary conduit downstream of the fifth and sixth tertiary conduits and upstream of the second primary conduit, and (d) a fourth of the exhaust gas sensors is positioned within the fourth secondary conduit downstream of the seventh and eight tertiary conduits and upstream of the second primary conduit.

10. The internal combustion engine system of claim 9, wherein each cylinder within each of the first, second, third, and fourth pairs of cylinders have firing orders that are separated by a value that ranges between 270° and 450°.

11. The internal combustion engine system of claim 9 further comprising a controller, wherein (i) the exhaust gas sensors are configured to communicate the measured air-to-fuel ratios of the first, second, third, or fourth pairs of cylinders to the controller and (ii) the controller is programmed to, in response to an oscillation in the measured air-to-fuel ratios (a) between the cylinders within the first pair of cylinders as measured by the first of the exhaust gas sensors exceeding a threshold, (b) between the cylinders within the second pair of cylinders as measured by the second of the exhaust gas sensors exceeding the threshold, (c) between the cylinders within the third pair of cylinders as measured by the third of the exhaust gas sensors exceeding the threshold, or (d) between the cylinders within the fourth pair of cylinders as measured by the fourth of the exhaust gas sensors exceeding the threshold, issue a fault.

12. The internal combustion engine system of claim 9 further comprising a controller, wherein (i) the exhaust gas sensors are configured to communicate the measured air-to-fuel ratios of the first and second pairs of cylinders to the controller and (ii) the controller is programmed to, in response to a difference or an absolute value of the difference between (a) average values of the measured air-to-fuel ratios of the cylinders within first pair of cylinders as measured by the first of the exhaust gas sensors and (b) average values of the measured air-to-fuel ratios of the cylinders within the second pair of cylinders as measured by the second of the exhaust gas sensors exceeding a threshold, issue a fault.

13. The internal combustion engine system of claim 12, wherein (i) the exhaust gas sensors are configured to communicate the measured air-to-fuel ratios of the third and fourth pairs of cylinders to the controller and (ii) the controller is programmed to, in response to a difference or an absolute value of the difference between (a) average values of the measured air-to-fuel ratios of the cylinders within third pair of cylinders as measured by the third of the exhaust gas sensors and (b) average values of the measured air-to-fuel ratios of the cylinders within the fourth pair of cylinders as measured by the fourth of the exhaust gas sensors exceeding a threshold, issue a fault.

14. The internal combustion engine system of claim 9 further comprising a controller, wherein (i) the exhaust gas sensors are configured to communicate the measured air-to-fuel ratios of the first and second pairs of cylinders to the controller, respectively, (ii) the controller is configured to generate air-to-fuel ratio commands to the first and second pairs of cylinders based on the measured air-to-fuel ratios from the exhaust gas sensors, and (iii) the controller is programmed to, in response to a difference or an absolute value of the difference between the air-to-fuel ratio commands to the first and second pairs of cylinders exceeding a threshold, issue a fault.

15. The internal combustion engine system of claim 14, wherein (i) the exhaust gas sensors are configured to communicate the measured air-to-fuel ratios of the third and fourth pairs of cylinders to the controller, (ii) the controller is configured to generate air-to-fuel ratio commands to the third and fourth pairs of cylinders based on the measured air-to-fuel ratios from the exhaust gas sensors, and (iii) the controller is programmed to, in response to a difference or an absolute value of the difference between the air-to-fuel ratio commands to the third and fourth pairs of cylinders exceeding a threshold, issue a fault.

16. An internal combustion engine system comprising:

a first set of cylinders having first and second subsets of cylinders;

a second set of cylinders having third and fourth subsets of cylinders;

exhaust manifolds having (i) primary conduits, (ii) secondary conduits branching from the primary conduits, (iii) and tertiary conduits branching from the secondary conduits, wherein the tertiary conduits associated with each of the secondary conduits are connected to one of the first, second, third, or fourth subsets of cylinders; and exhaust gas sensors (i) disposed within each of the secondary conduits and (ii) each configured to measure air-to-fuel ratios of one of the first, second, third, or fourth subsets of cylinders, wherein (a) a first of the exhaust sensors is positioned within a first of the secondary conduits downstream of the corresponding tertiary conduits and upstream of the corresponding primary conduit, (b) a second of the exhaust sensors is positioned within a second of the secondary conduits downstream of the corresponding tertiary conduits and upstream of the corresponding primary conduit, (c) a third of the exhaust sensors is positioned within a third of the secondary conduits downstream of the corresponding tertiary conduits and upstream of the corresponding primary conduit, and (d) a fourth of the exhaust sensors is positioned within a fourth of the secondary conduits downstream of the corresponding tertiary conduits and upstream of the corresponding primary conduit.

17. The internal combustion engine system of claim 16, wherein each cylinder within each of the first, second, third, and fourth subsets of cylinders have firing orders that are separated by at least 270°.

18. The internal combustion engine system of claim 16 further comprising a controller, wherein (i) the exhaust gas sensors are configured to communicate the measured air-to-fuel ratios of the first, second, third, and fourth subsets of cylinders to the controller and (ii) the controller is programmed to, in response to (a) a difference or an absolute value of the difference between (I) average values of the measured air-to-fuel ratios of the cylinders within the first subset of cylinders as measured by the first of the exhaust gas sensors and (II) average values of the measured air-to-fuel ratios of the cylinders within the second subset of cylinders as measured by the second of the exhaust gas sensors exceeding a threshold or (b) a difference or an absolute value of the difference between (I) average values of the measured air-to-fuel ratios of the cylinders within the third subset of cylinders as measured by the third of the exhaust gas sensors and (II) average values of the measured air-to-fuel ratios of the cylinders within the fourth subset of cylinders as measured by the fourth of the exhaust gas sensors exceeding the threshold, issue a fault.

19. The internal combustion engine system of claim 16 further comprising a controller, wherein (i) the exhaust gas sensors are configured to communicate the measured air-to-fuel ratios of the first, second, third, and fourth subsets of cylinders to the controller, (ii) the controller is configured to generate air-to-fuel ratio commands to the first, second, third, and fourth subsets of cylinders based on the measured air-to-fuel ratios from the exhaust gas sensors, and (iii) the controller is programmed to, in response to a difference or an absolute value of the difference between the air-to-fuel ratio commands to the first and second subsets of cylinders or a difference or an absolute value of the difference between the air-to-fuel ratio commands to the third and fourth subsets of cylinders exceeding a threshold, issue a fault.

20. The internal combustion engine system of claim 16 further comprising a controller, wherein (i) the first, second, third, and fourth of the exhaust gas sensors are configured to communicate the measured air-to-fuel ratios of the first, second, third, or fourth subsets of cylinders to the controller, respectively, and (ii) the controller is programmed to, in response to an oscillation in the measured air-to-fuel ratios (a) between the cylinders within the first subset of cylinders as measured by the first of the exhaust gas sensors exceeding a threshold, (b) between the cylinders within second subset of cylinders as measured by the second of the exhaust gas sensors exceeding the threshold, (c) between the cylinders within third subset of cylinders as measured by the third of the exhaust gas sensors exceeding the threshold, or (d) between the cylinders of cylinders within fourth subset of cylinders as measured by the fourth of the exhaust gas sensors exceeding the threshold, issue a fault.

* * * * *